(12) United States Patent  
Mathur et al.

(10) Patent No.: US 12,478,311 B1
(45) Date of Patent: Nov. 25, 2025

(54) SYSTEM AND METHOD FOR EARLY DETECTION OF MOVEMENT INSTABILITY

(71) Applicant: Neurco AI, San Diego, CA (US)

(72) Inventors: Aadit Pratap Mathur, San Diego, CA (US); Prerna Mathur, San Diego, CA (US)

(*) Notice: Subject to any disclaimer, the term of this patent is extended or adjusted under 35 U.S.C. 154(b) by 0 days.

(21) Appl. No.: 19/217,563

(22) Filed: May 23, 2025

Related U.S. Application Data

(60) Provisional application No. 63/800,396, filed on May 5, 2025.

(51) Int. Cl.
*A61B 5/397* (2021.01)
*A61B 5/00* (2006.01)
(Continued)

(52) U.S. Cl.
CPC ............ *A61B 5/397* (2021.01); *A61B 5/1126* (2013.01); *A61B 5/256* (2021.01); *A61B 5/296* (2021.01);
(Continued)

(58) Field of Classification Search
CPC ......... A61B 5/397; A61B 5/256; A61B 5/296; A61B 5/6802; A61B 5/7267; A61B 2562/0219; A61B 5/1118; A61B 5/02438; A61B 5/11; A61B 5/1116; A61B 5/1123; A61B 5/389; A61B 5/112; A61B 5/6824; G16H 50/30; G06T 2207/20084; G06T 2207/20081; G06T 7/20
See application file for complete search history.

(56) References Cited

U.S. PATENT DOCUMENTS

| | | | |
|---|---|---|---|
| 10,327,706 B2* | 6/2019 | Yarger | ................. G16H 40/67 |
| 2020/0375500 A1 | 12/2020 | Soriano et al. | |

FOREIGN PATENT DOCUMENTS

| | | |
|---|---|---|
| IN | 202341000248 A | 1/2023 |
| IN | 202441087925 A | 2/2025 |

(Continued)

OTHER PUBLICATIONS

Li, Yanran, Xu Zhang, Yanan Gong, Ying Cheng, Xiaoping Gao, and Xiang Chen. 2017. "Motor Function Evaluation of Hemiplegic Upper-Extremities Using Data Fusion from Wearable Inertial and Surface EMG Sensors" Sensors 17, No. 3: 582 (Year: 2017).*

*Primary Examiner* — Eric F Winakur
*Assistant Examiner* — Noah M Healy
(74) *Attorney, Agent, or Firm* — Caldwell Intellectual Property Law

(57) ABSTRACT

A system for early detection of movement instability includes a wearable device affixed to a body part of a subject, featuring at least one electromyography (EMG) sensor for detecting electrical muscle activity and at least one motion sensor for detecting movement. A computing device, communicatively connected to the wearable device, receives EMG data from the EMG sensor and motion data from the motion sensor. The computing device identifies movement instability patterns using a machine-learning model trained on datasets of known stable and unstable muscle activity data and movement patterns. It determines impairment indicators based on the identified movement instability patterns and generates a user interface displaying these indicators. This system facilitates early detection and monitoring of movement instability.

20 Claims, 10 Drawing Sheets

(51) Int. Cl.
  *A61B 5/11*   (2006.01)
  *A61B 5/256*  (2021.01)
  *A61B 5/296*  (2021.01)
  *G16H 10/60*  (2018.01)
  *G16H 50/30*  (2018.01)

(52) U.S. Cl.
  CPC .......... *A61B 5/6802* (2013.01); *A61B 5/7267* (2013.01); *A61B 5/7475* (2013.01); *G16H 10/60* (2018.01); *G16H 50/30* (2018.01); *A61B 2560/0462* (2013.01); *A61B 2562/0219* (2013.01)

(56) References Cited

FOREIGN PATENT DOCUMENTS

| | | | |
|---|---|---|---|
| IN | 202511009564 A | | 2/2025 |
| WO | WO 2024256465 | * | 6/2024 |
| WO | 2025042119 A1 | | 2/2025 |

\* cited by examiner

SYSTEM AND METHOD FOR EARLY DETECTION OF MOVEMENT INSTABILITY

CROSS-REFERENCE TO RELATED APPLICATIONS

This application claims the benefit of priority of U.S. Provisional Patent Application Ser. No. 63/800,396, filed on May 5, 2025, and titled "System and Method for Early Detection of Movement Instability Using EMG Sensors and Gyroscopic Data," which is incorporated by reference herein in its entirety.

FIELD OF THE INVENTION

The present invention generally relates to the field of wearable health technology. In particular, the present invention is directed to a system and method for early detection of movement instability.

BACKGROUND

Current methods to detect early neurological conditions such as Parkinson's disease or tremors predominantly depend on subjective clinical assessments and specialized medical equipment that is costly and not suitable for frequent or routine personal use. Such limitations impede timely intervention. Consequently, there exists a substantial need for an affordable, objective, accessible, and easy-to-use monitoring system enabling regular self-assessment and prompting timely medical consultations.

SUMMARY OF THE DISCLOSURE

In some aspects, the techniques described herein relate to a system for early detection of movement instability, the system including a wearable device configured to be affixed to at least one body part of a subject, wherein the wearable device includes at least one electromyography (EMG) sensor to detect electrical muscle activity of the subject, and at least one motion sensor to detect movement of the at least one body part, and a computing device communicatively connected to the wearable device, wherein the computing device is configured to receive EMG data from the at least one EMG sensor and motion data from the at least one motion sensor, identify a movement instability pattern as a function of the EMG data and the motion data using a pattern machine-learning model that has been trained on pattern training datasets including known stable and unstable muscle activity data and movement patterns, determine at least one impairment indicator as a function of the movement instability pattern, and generate a user interface including a display of the at least one impairment indicator.

In some aspects, the techniques described herein relate to a method for early detection of movement instability, the method including receiving, using a computing device communicatively connected to a wearable device, electromyography (EMG) data from at least one EMG sensor of the wearable device and motion data from at least one motion sensor of the wearable device, wherein the at least one EMG sensor to detect electrical muscle activity of the subject, and at least one motion sensor to detect movement of the at least one body part, identifying, using the computing device, a movement instability pattern as a function of the EMG data and the motion data using a pattern machine-learning model that has been trained on pattern training datasets including known stable and unstable muscle activity data and movement patterns, determining, using the computing device, at least one impairment indicator as a function of the movement instability pattern, and generating, using the computing device, a user interface including a display of the at least one impairment indicator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
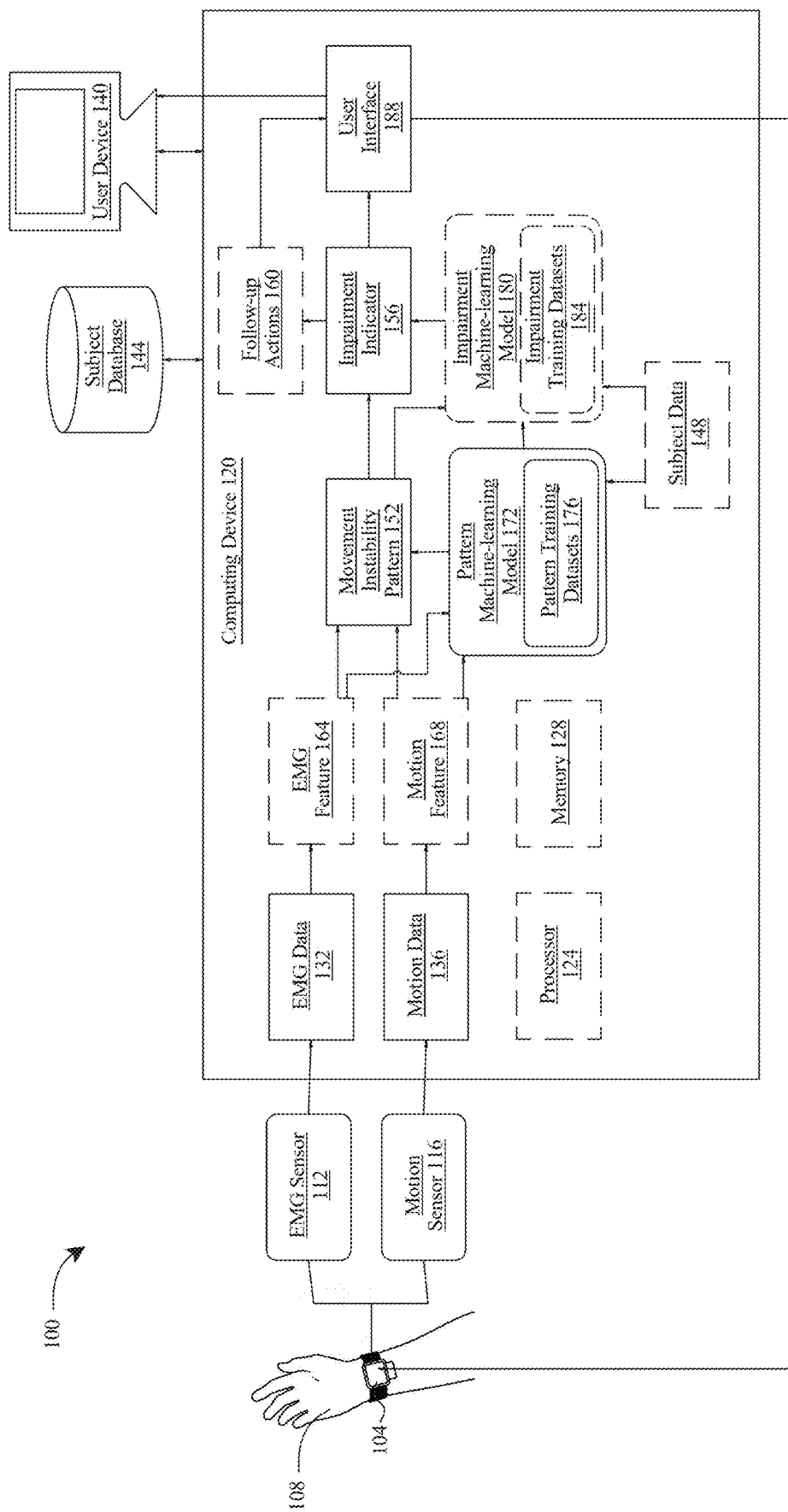
FIG. 1 illustrates a block diagram of an exemplary system for early detection of movement instability.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for early detection of movement instability. The system includes a wearable device configured to be affixed to at least one body part of a subject, wherein the wearable device includes at least one electromyography (EMG) sensor to detect electrical muscle activity of the subject, and at least one motion sensor to detect movement of the at least one body part, and a computing device communicatively connected to the wearable device, wherein the computing device is configured to receive EMG data from the at least one EMG sensor and motion data from the at least one motion sensor, identify a movement instability pattern as a function of the EMG data and the motion data using a pattern machine-learning model that has been trained on pattern training datasets including known stable and unstable muscle activity data and movement patterns, determine at least one impairment indicator as a function of the movement instability pattern, and generate a user interface including a display of the at least one impairment indicator.

In some aspect, systems and methods for detection and monitoring of involuntary limb movements associated with early symptoms of neurological disorders like Parkinsonism, particularly noticeable initially in the hands or fingers of adults aged 22 and above may be disclosed. The system may include wearable sensors combining EMG and gyroscopic technologies strategically positioned on limbs to collect real-time muscle and motion stability data. A specialized algorithm may process these data streams, distinguishing between stable movements and patterns indicating instability or tremors. This system may provide users with understandable feedback regarding their stability, promoting early detection and professional consultation.

In some embodiments, the system may integrate wearable EMG sensors and gyroscopes precisely placed on the user's hand, wrist, leg, and ankle. The EMG sensors may detect electrical muscle activity patterns, while gyroscopic sensors track limb orientation, acceleration, and rotational dynamics. Collected data may be transmitted wirelessly and securely to a mobile or computing device equipped with an analytical algorithm specifically designed for this application.

In some embodiments, the proprietary algorithm may employ machine learning techniques trained on datasets encompassing stable and unstable movement patterns, effectively identifying deviations indicative of early neurological impairments. Processed results may be communicated clearly and promptly to users, facilitating awareness and timely consultation with healthcare providers.

Exemplary embodiments illustrating aspects of the present disclosure are described below in the context of several specific examples.

Referring now to FIG. 1, an exemplary embodiment of system 100 for early detection of movement instability is illustrated. System 100 includes a wearable device 104. Wearable device 104 is configured to be affixed to at least one body part 108 of a subject. For the purposes of this disclosure, a "subject" is an individual wearing or otherwise interacting with a system 100. As a non-limiting example, subject may be a patient, user, or individual undergoing diagnostic, therapeutic, monitoring, or assistive evaluation. For the purposes of this disclosure, a "body part" is any anatomical region of a subject's body to which the wearable device may be affixed. As a non-limiting example, body part 108 may include hand, wrist, forearm, upper arm, shoulder, leg, thigh, ankle, or foot.

With continued reference to FIG. 1, a "wearable device," as used in this disclosure, is a device designed to be worn on a subject that is configured to collect sensor data, where "on the subject" indicates that the device is portable and is either worn on the subject, inside the subject, in contact with the subject, or in close proximity to the subject. In some embodiments, wearable device 104 may be physically configured to be affixed to wrist, forearm, hand, leg, thigh, ankle, or the like. In some embodiments, wearable device 104 may include one or more fastening mechanisms. As a non-limiting example, wearable device 104 may include adjustable straps, elastic bands, hook-and-loop closures, buckles, or medical-grade adhesive materials suitable for skin contact. In some embodiments, wearable device 104 may include a flexible or semi-rigid housing formed of biocompatible materials, allowing the wearable device 104 may include to conform to the contours of the selected body part 108. In some embodiments, secure affixation of wearable device 104 may be configured for consistent alignment of the embedded sensors (e.g., electromyography (EMG) sensors 112 and motion sensors 116) with the underlying muscle groups or skeletal structure, thereby facilitating accurate acquisition of physiological and kinematic data. As a non-limiting example, wearable device 104 may include a smart watch, wearable fitness tracker, wearable health tracker, and the like. In some embodiments, wearable device 104 may include one or more EMG sensors 112, accelerometers, gyroscopes, or other biometric sensing components. For example, and without limitation, wearable device 104 may include APPLE WATCH®, FITBIT®, GALAXY WATCH®, and the like.

With continued reference to FIG. 1, wearable device 104 includes at least one electromyography (EMG) sensor 112 to detect electrical muscle activity of a subject. For the purposes of this disclosure, "electrical muscle activity" is a bioelectrical signal generated by the depolarization and repolarization of muscle fibers in response to neural stimulation, which reflects the physiological process of muscle contraction. For the purposes of this disclosure, an "electromyography sensor" is a bioelectrical sensing component configured to measure electrical activity and convert the electrical activity generated by skeletal muscle tissue into an electrical signal. In some embodiments, EMG sensor 112 may be implemented as a surface electrode sensor. In some embodiments, EMG sensor 112 may include a set of surface electrodes configured to be positioned over the skin above a target muscle group of a subject. In some embodiments, EMG sensor 112 may function by detecting the electrical potential difference produced when motor neurons activate muscle fibers. For example, and without limitation, voltage fluctuations may fall within a range of 0 to 10 millivolts and may exhibit frequency content between approximately 10 Hz and 500 Hz. In some embodiments, EMG sensor 112 may include one or more biocompatible electrodes arranged in a differential configuration, wherein a pair of electrodes is placed along the length of the muscle, and a reference electrode may be positioned on an electrically neutral location. In some embodiments, differential signal may be amplified by a low-noise instrumentation amplifier to enhance the signal-to-noise ratio, followed by analog filtering stages to remove motion artifacts and high-frequency interference. In some embodiments, resulting analog signal may then be digitized by an analog-to-digital converter for real-time processing by a computing device 120. In some embodiments, EMG sensor 112 may be integrated directly into a flexible substrate within a wearable device 104 and may communicate with computing device 120 using wired or wireless interfaces.

With continued reference to FIG. 1, wearable device 104 includes at least one motion sensor to detect movement of at least one body part 108 of a subject. For the purposes of this disclosure, a "motion sensor" is a component configured to detect and measure movement-related parameters of a body part. As a non-limiting example, motion sensor 116 may detect acceleration, angular velocity, orientation, or displacement. In some embodiments, motion sensors 116 may be embedded within a wearable device 104. In some embodiments, motion sensor 116 may include one or more microelectromechanical systems (MEMS) components. As a non-limiting example, motion sensor 116 may include at least an accelerometer and a gyroscope. For the purposes of this disclosure, an "accelerometer" is a sensor that is configured to detect and measure linear acceleration along one or more spatial axes. In a non-limiting example, an accelerometer may be configured to detect linear acceleration forces along one or more axes in a tri-axial configuration (X, Y, Z), and may be used to infer translational movement, static tilt, or impact. For the purposes of this disclosure, a "gyroscope" is a sensor that is configured to measure the angular velocity or rotational rate. In a non-limiting example, a gyroscope may be configured to measure angular velocity along three orthogonal axes, and may be used to detect rotational motion, direction of movement, or tremor signatures. In some embodiments, motion sensor 116 may include a magnetometer to detect absolute orientation with respect to the Earth's magnetic field, thereby enabling full inertial orientation tracking when combined with accelerometer and gyroscope data in a sensor fusion algorithm. In some embodiments, wearable device 104 may include a variety of sensors configured to collect physiological and environmental data from a subject. As a non-limiting example, wearable device 104 may include temperature sensor, photoplethysmography (PPG) sensor, galvanic skin response (GSR) sensor, pressure sensor, and the like.

With continued reference to FIG. 1, system 100 includes a computing device 120. Computing device 120 is communicatively connected to wearable device 104. Computing device 120 may include a processor 124 and memory 128 communicatively connected to the processor 124. In some embodiments, computing device 120 may be local to wearable device 104. As a non-limiting example, computing device 120 may be embedded within wearable device 104. In a non-limiting example, local computing device may include a microcontroller, a processor 124, or a system-on-chip (SoC) configured to process sensor data in real time, execute machine-learning models, and generate user interface elements directly on a paired display or connected mobile application. In some embodiments, computing device 120 may be remote from wearable device 104. In a non-limiting example, computing device 120 may be communicatively coupled with wearable device 104 using a wireless data connection, such as Bluetooth, Wi-Fi, or a cellular network. In a non-limiting example, computing device 120 may incorporate a software program (e.g., app) designed for use on devices. In such embodiments, wearable device 104 may function as a data acquisition module, transmitting EMG data 132 and motion data 136 to a remote computing device for further processing. In some embodiments, the remote computing device may include a mobile phone, a tablet, a personal computer, or a cloud-based server system configured to execute complex machine learning algorithms, perform historical data aggregation, and present feedback to a user through a graphical interface or a web-based dashboard.

With continued reference to FIG. 1, system 100 may include circuitry such as without limitation a processor 124 communicatively connected to a memory 128; for instance, circuitry may include and/or be included in a computing device. In some embodiments, memory 128 may include a non-transitory computer executable storage medium. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory 128 may be attached thereto to further configure the hardware unit using read-only memory (ROM) or any other static or writable memory as described in this disclosure. Alternatively or additionally, hardware units and/or modules may be combined with and/or in communication with a processor 124, such as without limitation in a system-on-chip architecture wherein some functions are configured by modification or design of hardware circuitry, such as without limitation FPGA circuitry, while others are configured in the form of instructions in memory 128 for one or more processors 124. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 120 may be designed and/or configured to perform any method, method step, or sequence of method steps in any embodiment described in this disclosure, in any order and with any degree of repetition. For instance, computing device 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 120 is configured to receive EMG data 132 from at least one EMG sensor 112. For the purposes of this disclosure, "EMG data" is information representing the electrical muscle activity acquired from a subject. In some embodiments, EMG data 132 may include voltage signals that reflect the depolarization and repolarization of muscle fibers during contraction events. In some embodiments, EMG data 132 may serve as a quantitative measure of neuromuscular activation. In some embodiments, EMG data 132 may include time-series signals collected from surface or intramuscular electrodes. In some embodiments, EMG data 132 may include raw voltage measurements, rectified signals, or feature-extracted parameters.

With continued reference to FIG. 1, computing device 120 is configured to receive motion data 136 from at least one motion sensor 116. For the purposes of this disclosure, "motion data" is information represents the dynamic movement, orientation, or acceleration of at least one body part of a subject. As a non-limiting example, motion data 136 may include linear acceleration, angular velocity, displacement, velocity, or orientation metrics. In some embodiments, motion data 136 may be expressed as time-series measurements captured across one or more spatial axes. As a non-limiting example, motion data 136 from accelerometer may include translational forces along X, Y, and Z axes and may be used to detect postural changes, limb motion amplitude, or impacts. As another non-limiting example, motion data 136 from a gyroscope may measure angular velocity around the three principal axes and may be used to characterize rotational movements, such as joint articulation, limb swing, or involuntary tremors. As another non-limiting example, motion data 136 may include estimates of absolute orientation, pitch, roll, and yaw.

With continued reference to FIG. 1, in some embodiments, computing device 120 may receive EMG data 132 and/or motion data 136 from a user device 140. For the purposes of this disclosure, a "user device" is any device that a user may use to input data. As a non-limiting example, user device 140 may include a laptop, desktop, tablet, mobile phone, smart phone, smart watch, kiosk, screen, smart headset, or things of the like. For the purposes of this disclosure, a "user" is an individual or entity that uses a system 100. As a non-limiting example, user may include subject, physician, technician, medical professional, and the like. In some embodiments, user device 140 may include an interface configured to receive inputs from a user. In some embodiments, a user may manually input any data into system 100 using user device 140. In some embodiments, a user may have a capability to process, store or transmit any information independently.

With continued reference to FIG. 1, in some embodiments, computing device 120 may receive EMG data 132 and/or motion data 136 from a subject database 144. As used in this disclosure, a "subject database" is a data structure configured to store data associated with a subject. As a non-limiting example, subject database 144 may store EMG data 132, motion data 136, subject data 148, training datasets, movement instability pattern 152, impairment indicator 156, follow-up actions 160, and the like. In one or more embodiments, subject database 144 may include inputted or calculated information and datum related to a subject or movement instability pattern 152. In some embodiments, a datum history may be stored in subject database 144. As a non-limiting example, the datum history may include real-time and/or previous inputted data related to a subject or movement instability pattern 152. As a non-limiting example, subject database 144 may include instructions from a user, who may be an expert user, a past user in embodiments disclosed herein, or the like, where the instructions may include examples of the data related to a subject or movement instability pattern 152.

With continued reference to FIG. 1, in some embodiments, computing device 120 may be communicatively connected with subject database 144. For example, and without limitation, in some cases, subject database 144 may be local to computing device 120. In another example, and without limitation, subject database 144 may be remote to computing device 120 and communicative with computing device 120 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure computing device 120 connects directly, dynamically, and non-hierarchically to as many other computing devices as possible. A "network topology" as used in this disclosure is an arrangement of elements of a communication network.

With continued reference to FIG. 1, in some embodiments, subject database 144 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, receiving EMG data 132 and motion data 136 may include receiving encrypted EMG data and encrypted motion data and decrypting the encrypted EMG data and the encrypted motion data using a cryptographic key stored in a memory 128. For the purposes of this disclosure, "encrypted EMG data" is EMG data that has been transformed from its original, readable form into a secured, encoded format. For the purposes of this disclosure, a "decrypted motion data" is motion data that has been transformed from its original, readable form into a secured, encoded format. For the purposes of this disclosure, "encryption" refers to a process of applying a cryptographic algorithm to transform the raw or preprocessed data into an encoded format that is unintelligible without authorized decryption keys. In a non-limiting example, encrypting may protect data from unauthorized access, interception, or tampering, particularly when the data is transmitted wirelessly from wearable device 104 to computing device 120. In some embodiments, encryption process may be performed locally by a secure hardware element or firmware module integrated within wearable device 104. For example, and without limitation, EMG data 132 and motion data 136 may be encrypted using symmetric key encryption methods. Once encrypted, the data packets may be transmitted to computing device 120, where a secure decryption process may be performed to recover the original sensor signals prior to analysis by a processor 124. For the purposes of this disclosure, "decryption" refers to a process by which encrypted data is transformed back into its original, readable form. In some embodiments, decryption may involve include application of a symmetric-key cryptographic algorithm, in which the same key used to encrypt the data (EMG data 132, motion data 136, and the like) on the wearable device 104 may be securely stored and used by a computing device 120 to decrypt the data (encrypted EMG data, encrypted motion data, and the like) upon receipt. In some embodiments, decrypting may include using asymmetric encryption protocols, wherein a public key is used for encryption and a private key is used for decryption. For the purposes of this disclosure, a "cryptographic key" is a string of data used to encrypt and decrypt data.

With continued reference to FIG. 1, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, receiving EMG data 132 and motion data 136 may include preprocessing the EMG data 132 and the motion data 136. In some embodiments, preprocessing may include amplification of the raw voltage signal of EMG data 132 using a low-noise differential amplifier, followed by analog or digital band-pass filtering to isolate the physiological frequency band of interest. In some embodiments, preprocessing may include full-wave rectification, signal normalization, and envelope detection, depending on the intended analysis. In some embodiments, preprocessing of motion data 136 may include calibration and filtering steps applied to raw output from gyroscopes and accelerometers. As a non-limiting example, calibration may involve offset correction, scaling, and axis alignment to ensure consistent units and orientation references. As a non-limiting example, filtering may include low-pass filters to reduce high-frequency noise, or high-pass filters to remove gravitational components in accelerometer signals. In some embodiments, preprocessing may include data resampling or interpolation to match sampling rates between EMG sensors 112 and motion sensors 116.

With continued reference to FIG. 1, in some embodiments, computing device 120 is configured to identify a movement instability pattern 152 as a function of EMG data 132 and motion data 136. For the purposes of this disclosure, a "movement instability pattern" is a sequence of features or characteristics that indicate abnormal or inconsistent movement behavior in a subject. As a non-limiting example, a movement instability pattern 152 may include recurrent fluctuations in EMG amplitude, irregular timing of muscle activation, elevated signal entropy, or inconsistent activation symmetry, which may reflect neuromuscular irregularities.

With continued reference to FIG. 1, in some embodiments, identifying movement instability pattern 152 may include synchronizing EMG data 132 and motion data 136 as a function of time references of each of the EMG data 132 and the motion data 136. For the purposes of this disclosure, "time references" are numerical values or markers that indicate the time at which each data sample was acquired. As a non-limiting example, time references may include time stamps. In some embodiments, time references may be derived from a shared system clock or a synchronized timing source and may be expressed as absolute timestamps or relative timestamps. For example, and without limitation, EMG data 132 and motion data 136 collected at different sampling rates can be aligned by matching their time references to create temporally corresponding segments.

With continued reference to FIG. 1, in some embodiments, identifying movement instability pattern 152 may include segmenting EMG data 132 and motion data 136 into a plurality of time windows. For the purposes of this disclosure, a "time window" is a fixed-duration temporal segment. In some embodiments, each time window may represent a discrete interval along the system's continuous time axis, within which signal features (e.g., EMG feature 164 or motion feature 168) are extracted to characterize EMG data 132 or motion data 136 during that specific period. In some embodiments, time window may have a various duration. As a non-limiting example, time window may include 100 milliseconds, 250 milliseconds, 500 milliseconds, 10 seconds, 30 seconds, 1 minute, and the like. In some embodiments, size of the time window may be constant throughout system operation. In some embodiments, time windows may be non-overlapping, with each successive window starting immediately after the previous one ends.

With continued reference to FIG. 1, for the purposes of this disclosure, "segmenting data" refers to a process by which temporal data is divided into time windows. In some embodiments, segmenting data may include assigning or interpreting time references associated with each individual data sample from both EMG data 132 and motion data 136. In a non-limiting example, time references may be derived from a shared system clock and may allow the computing device 120 to determine the exact acquisition time of each sample. In some embodiments, system may define a sequence of time windows, each characterized by a start time and an end time. Once the time window boundaries are established, system may group all EMG and motion data samples whose time references fall within each window. In some embodiments, defining the sequence of time windows may include filtering data arrays based on timestamp values or applying rolling indices in buffer memory. In a non-limiting example, in a case where EMG and motion sensors operate at different sampling rates, computing device 120 may apply interpolation, resampling, or nearest-neighbor matching to ensure that both modalities provide temporally aligned data within each window. In some embodiments, computing device 120 may divide EMG data 132 and motion data 136 into a plurality of segments, where each segment may include a temporally consistent subset of EMG data 132 and motion data 136 corresponding to that window's duration.

With continued reference to FIG. 1, in some embodiments, identifying movement instability pattern 152 may include extracting, for each time window of the plurality of time windows, one or more EMG features 164 from the EMG data 132 indicative of muscle activation and one or more motion features 168 from the motion data 136 indicative of rotational movement and identifying the movement instability pattern 152 as a function of the one or more EMG features 164 and the one or more motion features 168. For the purposes of this disclosure, an "EMG feature" is a descriptor of EMG data that quantitatively characterizes one or more aspects of muscle activation. As a non-limiting example, EMG features 164 may include root mean square (RMS), mean absolute value (MAV), waveform length (WL), zero-crossing rate (ZCR), and slope sign change (SSC), which describe the amplitude, frequency, and temporal dynamics of an EMG signal. As another non-limiting example, EMG features 164 may include median frequency, mean frequency, peak frequency, and spectral entropy. For the purposes of this disclosure, a "motion feature" is a descriptor of motion data that characterizes one or more aspects of physical movement or orientation of a body part. As a non-limiting example, motion features 168 may include angular velocity variance, peak angular velocity, linear acceleration magnitude, movement onset latency, and directional change metrics. As another non-limiting example, motion features 168 may include dominant frequency components, power spectral density in specific frequency bands (e.g., tremor-related bands), and signal energy. In some embodiments, motion features 168 may capture information about movement regularity, speed, and oscillatory behavior. In a non-limiting example, computing device 120 may calculate the root mean square (RMS) using a standard formula that computes the square root of the mean of the squared signal values within a time window. In another non-limiting example, computing device 120 may count zero-crossings by iterating through signal samples and tracking sign changes. In another non-limiting example, computing device 120 may compute variance or mean absolute value (MAV) using basic statistical functions over the segmented data. In another non-limiting example, computing device 120 may perform Fourier Transform (FFT) to convert time-domain data into the frequency domain for frequency-based features.

With continued reference to FIG. 1, in some embodiments, processor 124 may extract EMG features 164 and/or motion features 168 using a deep neural network (DNN). In some embodiments, DNN may include a convolutional neural network (CNN), recurrent neural network (RNN), temporal convolutional network (TCN), or the like. In some embodiments, DNN may include multiple convolutional layers to identify local waveform patterns, followed by pooling layers for dimensionality reduction and fully connected layers for feature encoding. In some embodiments, DNN may incorporate long short-term memory (LSTM) or gated recurrent unit (GRU) layers to preserve temporal context and detect dynamic changes in the signal over time.

With continued reference to FIG. 1, in some embodiments, EMG features 164 and motion features 168 may be concatenated into a fused feature vector. For the purposes of this disclosure, a "fused feature vector" is a set of numerical values including both EMG features and motion features. In some embodiments, computing device 120 may construct a fused feature vector by concatenating EMG features 164 and motion features 168 into a single, ordered array of numerical values.

With continued reference to FIG. 1, in some embodiments, computing device 120 is configured to identify a movement instability pattern 152 as a function of EMG data 132 and motion data 136 using a pattern machine-learning model 172 that has been trained on pattern training datasets 176 including known stable and unstable muscle activity data and movement patterns. For the purposes of this disclosure, a "pattern machine-learning model" is a computational model configured to identify a movement instability pattern. In some embodiments, computing device 120 may input, into pattern machine-learning model 172, EMG data 132, motion data 136, EMG feature 164, motion feature 168 and/or fused feature vectors and pattern machine-learning model 172 may generate an output that characterizes the movement behavior of the subject (e.g., movement instability pattern 152). In some embodiments, pattern machine-learning model 172 may include a supervised learning model such as a neural network, support vector machine (SVM), decision tree, random forest, or logistic regression model. For the purposes of this disclosure, "pattern training datasets" are structured collections of data samples used to train a pattern machine-learning model. In a non-limiting example, each pattern training dataset may include multiple fused feature vectors generated from one or more subjects under controlled or observed conditions. In some embodiments, each data sample in pattern training dataset 176 may be labeled with a ground-truth classification indicating the stability or abnormality of the corresponding movement segment. In some embodiments, computing device 120 may be configured to generate pattern training datasets 176. Pattern training datasets 176 includes known stable and unstable muscle activity data and movement patterns. In some embodiments, pattern training datasets 176 may be stored in subject database 144. In some embodiments, pattern training datasets 176 may be received from one or more users, subject database 144, external computing devices, and/or previous iterations of processing. As a non-limiting example, pattern training datasets 176 may include instructions from a user, who may be an expert user, a past user in embodiments disclosed herein, or the like, which may be stored in memory and/or stored in subject database 144, where the instructions may include labeling of training examples. In some embodiments, pattern training datasets 176 may be updated iteratively on a feedback loop. As a non-limiting example, computing device 120 may update pattern training datasets 176 iteratively through a feedback loop as a function of subject data 148, EMG data 132, motion data 136, or the like. The subject data 148 disclosed herein is further described in detail below. In some embodiments, computing device 120 may be configured to generate a pattern machine-learning model 172. In a non-limiting example, generating pattern machine-learning model 172 may include training, retraining, or fine-tuning pattern machine-learning model 172 using pattern training datasets 176 or updated pattern training datasets 176. In some embodiments, pattern machine-learning model 172 may have been trained with pattern training datasets 176. In some embodiments, computing device 120 may be configured to determine movement instability pattern 152 using pattern machine-learning model 172 (i.e., trained or updated pattern machine-learning model 172). In some embodiments, pattern machine-learning model 172 may function differently between training time and inference time. In a non-limiting example, at training time, computing device 120 may be configured to train, retrain, or fine-tune pattern machine-learning model 172 using pattern training datasets 176. During the training time, pattern machine-learning model 172 may learn to associate patterns within known stable and unstable muscle activity data and movement patterns. In a non-limiting example, at inference time, trained pattern machine-learning model 172 may be configured to receive previously unseen EMG data 132, motion data 136, EMG feature 164, motion feature 168 and/or fused feature vectors and, based on the representations learned during training time, automatically output a movement instability pattern 152. Inference may be triggered in response to a user request, system event, or automated workflow operation.

With continued reference to FIG. 1, in some embodiments, subject or subject data 148 may be classified to a subject cohort using a cohort classifier. Cohort classifier may be consistent with any classifier discussed in this disclosure. Cohort classifier may be trained on cohort training data, wherein the cohort training data may include subject data 148 correlated to subject cohorts. In some embodiments, a subject may be classified to a subject cohort and computing device 120 may determine movement instability pattern 152 based on the subject cohort using a machine-learning module as described in detail with respect to FIG. 5 and the resulting output may be used to update pattern training datasets 176. In some embodiments, generating training data and training machine-learning models may be simultaneous. In some embodiments, computing device 120 may identify movement instability pattern 152 without the use of pattern machine-learning model 172. In some embodiments, processor 124 may train multiple machine-learning models separately for different subject cohorts and select a machine-learning model that is optimized for a subject using a wearable device 104 to use in data processing. For example, and without limitation, a first model may be trained using training datasets associated with subjects over the age of 50, and a second model may be trained on datasets associated with younger subjects and the first model may be selected for data processing if a subject is 52 years old. Upon classification of a subject to a given subject cohort based on subject data 148, computing device 120 may select and apply a corresponding cohort-specific machine-learning model to process data (e.g., identifying movement instability pattern 152, generating one or more impairment indicators 156, and the like).

With continued reference to FIG. 1, computing device 120 is configured to determine at least one impairment indicator 156 as a function of movement instability pattern 152. For the purposes of this disclosure, an "impairment indicator" is information that reflects the presence, severity, or likelihood of a movement-related abnormality in a subject. In some embodiments, impairment indicator 156 may serve as a clinical or functional assessment metric. In some embodiments. In some embodiments, impairment indicator 156 may be used to inform users, caregivers, medical professionals or subjects of potential motor instability or early-stage neurological or musculoskeletal impairment. In some embodiments, impairment indicator 156 may take the form of a classification label. As a non-limiting example, impairment indicator 156 may include "stable," "unstable," "tremor-detected," or the like. In some embodiments, impairment indicator 156 may include a severity score on a continuous scale. As a non-limiting example, impairment indicator 156 may include a stability index ranging from 0 to 1 or 0 to 10. In some embodiments, impairment indicator 156 may include a probabilistic output indicating the likelihood of a specific type of impairment.

With continued reference to FIG. 1, in some embodiments, computing device 120 may determine impairment indicator 156 using an impairment machine-learning model 180. In some embodiments, computing device 120 may determine impairment indicator 156 by applying rule-based logic or thresholding criteria. For the purposes of this disclosure, an "impairment machine-learning model" is a computational model configured to determine an impairment indicator. In some embodiments, computing device 120 may input, into impairment machine-learning model 180, movement instability pattern 152 and impairment machine-learning model 180 may generate an output impairment indicator 156. In some embodiments, impairment machine-learning model 180 may include a supervised learning model such as a neural network, support vector machine (SVM), decision tree, random forest, or logistic regression model. For the purposes of this disclosure, "impairment training datasets" are structured collections of data samples used to train an impairment machine-learning model. In some embodiments, computing device 120 may be configured to generate impairment training datasets 184. In a non-limiting example, impairment training datasets 184 may include pairs of movement instability patterns and impairment indicators. In some embodiments, impairment training datasets 184 may be stored in subject database 144. In some embodiments, impairment training datasets 184 may be received from one or more users, subject database 144, external computing devices, and/or previous iterations of processing. As a non-limiting example, impairment training datasets 184 may include instructions from a user, who may be an expert user, a past user in embodiments disclosed herein, or the like, which may be stored in memory and/or stored in subject database 144, where the instructions may include labeling of training examples. In some embodiments, impairment training datasets 184 may be updated iteratively on a feedback loop. As a non-limiting example, computing device 120 may update impairment training datasets 184 iteratively through a feedback loop as a function of subject data 148, EMG data 132, motion data 136, user feedback, or the like. The subject data 148 disclosed herein is further described in detail below. In some embodiments, computing device 120 may be configured to generate an impairment machine-learning model 180. In a non-limiting example, generating impairment machine-learning model 180 may include training, retraining, or fine-tuning impairment machine-learning model 180 using impairment training datasets 184 or updated impairment training datasets 184. In some embodiments, impairment machine-learning model 180 may have been trained with impairment training datasets 184. In some embodiments, computing device 120 may be configured to determine impairment indicator 156 using impairment machine-learning model 180 (i.e., trained or updated impairment machine-learning model 180). In some embodiments, impairment machine-learning model 180 may function differently between training time and inference time. In a non-limiting example, at training time, computing device 120 may be configured to train, retrain, or fine-tune impairment machine-learning model 180 using impairment training datasets 184. During the training time, impairment machine-learning model 180 may learn to associate movement instability pattern 152 and impairment indicator 156. In a non-limiting example, at inference time, trained impairment machine-learning model 180 may be configured to receive previously unseen movement instability pattern 152 and, based on the representations learned during training time, automatically output an impairment indicator 156. Inference may be triggered in response to a user request, system event, or automated workflow operation.

With continued reference to FIG. 1, in some embodiments, determining at least one impairment indicator 156 may include receiving subject data 148 from a user device 140 or subject database 144, classifying the subject data 148 to subject cohorts as a function of subject demographics of the subject data 148 and determining the at least one impairment indicator 156 as a function of the subject cohorts. For the purposes of this disclosure, "subject data" is any information associated with a specific. As a non-limiting example, subject data may include prior follow-up actions, age, sex, height, weight, medical history, diagnosis status, and the like. For the purposes of this disclosure, a "subject cohort" is a group of subjects who share one or more common attributes or movement-related characteristics. As a non-limiting example, subject cohorts may be defined based on demographic categories (e.g., age group, sex), physiological traits (e.g., baseline muscle strength, gait asymmetry), clinical status (e.g., diagnosed with early-stage Parkinson's disease), or sensor-derived features (e.g., high variability in EMG activation). In some embodiments, computing device 120 may classify a new subject (e.g., subject data 148) into one or more subject cohorts using rule-based criteria, clustering algorithms, or similarity metrics. In some embodiments, subject or subject data 148 may be classified to a subject cohort using a cohort classifier. Cohort classifier may be consistent with any classifier discussed in this disclosure. Cohort classifier may be trained on cohort training data, wherein the cohort training data may include subject data 148 correlated to subject cohorts. In some embodiments, a subject may be classified to a subject cohort and computing device 120 may determine impairment indicator 156 based on the subject cohort using a machine-learning module as described in detail with respect to FIG. 5 and the resulting output may be used to update impairment training datasets 184. In some embodiments, generating training data and training machine-learning models may be simultaneous. In some embodiments, computing device 120 may determine impairment indicator 156 without the use of impairment machine-learning model 180.

With continued reference to FIG. 1, in some embodiments, determining at least one impairment indicator 156 may include identifying a severity score of movement instability pattern 152 as a function of EMG features 164 and motion features 168. For the purposes of this disclosure, a "severity score" is a value that reflects the degree, magnitude, or clinical significance of a movement instability pattern. In some embodiments, severity score may serve as a metric that captures how abnormal, inconsistent, or uncontrolled the subject's movement is. In some embodiments, severity score may be computed by evaluating movement instability pattern 152 using statistical or machine-learning models trained to map features (e.g., EMG feature 164, motion feature or fused feature vector) to a numerical index of instability severity. As a non-limiting example, severity score may fall within a bounded numerical range (e.g., 0 to 1 or 0 to 100), where higher values represent greater movement instability or dysfunction. In some embodiments, severity score may be compared to one or more predefined severity thresholds to determine a degree of impairment indicator 156 (e.g., "mild," "moderate," or "severe" instability). In some embodiments, user may manually determine severity score. For the purposes of this disclosure, a "severity threshold" is a boundary to evaluate the significance of a severity score. In some embodiments, severity threshold may function as a decision criterion that enables computing device 120 to classify the severity of the subject's movement impairment and to determine whether, and to what extent, a follow-up action or impairment indicator 156 should be triggered or escalated. In a non-limiting example, severity threshold may be 0.6 for moderate instability.

With continued reference to FIG. 1, in some embodiments, determining at least an impairment indicator 156 may include generating one or more follow-up actions 160 as a function of at least an impairment indicator 156 and at least one prior follow-up action associated with a subject. For the purposes of this disclosure, "follow-up actions" are actions that are recommended based on the presence of at least one impairment indicator. As a non-limiting example, follow-up actions 160 may include clinical interventions, such as recommending the initiation or adjustment of a medical treatment, referring the subject for clinical evaluation, or suggesting neurological or physical assessments. As a non-limiting example, follow-up actions 160 may include therapeutic actions, including structured physical therapy, balance training, gait correction exercises, or occupational therapy regimens intended to reduce instability. As a non-limiting example, follow-up actions 160 may include behavioral adjustments, such as advising the subject to avoid high-risk movements, use assistive devices, modify daily activity routines, or implement fall-prevention strategies. As a non-limiting example, follow-up actions 160 may include lifestyle modifications, including changes to exercise routines, sleep hygiene, stress management, or other personal habits that may influence neuromuscular performance. In some embodiments, follow-up actions 160 may be determined based on the nature, frequency, and severity of impairment indicator 156. In some embodiments, follow-up actions 160 may be tailored to individual subjects using subject data 148, subject cohorts, or prior treatment outcomes. As a non-limiting example, subject data 148 may include prior impairment indicators, demographic information, known medical conditions, or prior follow-up actions. For example, and without limitation, a moderate instability of impairment indicator 156 may lead to different follow-up actions 160 recommended for an elderly subject than for a younger individual. In some embodiments, computing device 120 may determine impairment indicator 156 using a rule-based decision tree, in which predefined logic maps certain impairment states to specific follow-up actions (e.g., if "severe instability," then recommend medical consultation). In some embodiments, computing device 120 may determine impairment indicator 156 using a trained machine-learning model, such as a decision support system, which has learned from labeled data to associate specific combinations of impairment indicators 156 and subject data with appropriate follow-up actions 160 (e.g., treatment recommendations, behavioral guidelines). In some embodiments, user may manually determine follow-up actions 160. In some embodiments, computing device 120 may store follow-up action 160 in the subject's digital record. This action can become part of the decision context for future impairment evaluations, allowing the system to avoid redundant recommendations or escalate action levels over time.

With continued reference to FIG. 1, in some embodiments, generating impairment indicator 156 may include generating a user-facing notification through a mobile application, wearable display, or auditory alert indicating the detection of abnormal movement patterns, logging the impairment indicator 156 in a local or cloud-based subject profile for longitudinal tracking, transmitting the impairment indicator 156 to a clinician, caregiver, or remote monitoring platform for review, recommending further diagnostic procedures or a clinical evaluation based on the current and historical movement instability data, and the like.

With continued reference to FIG. 1, computing device 120 is configured to generate a user interface 188 including a display of at least one impairment indicator 156. As a non-limiting example, user interface 188 may include graphical elements, such as color-coded icons, progress bars, trend graphs, or severity meters that visually communicate a severity score. For example, and without limitation, user interface 188 may include textual output, such as descriptive labels (e.g., "Moderate Instability Detected"), alerts (e.g., "Follow-up Recommended"), or numeric values (e.g., stability score: 0.72). For example, and without limitation, user interface 188 may include time-series visualizations, showing historical trends of the impairment indicator over days, weeks, or sessions. For example, and without limitation, user interface 188 may include interactive elements, such as clickable links or buttons for scheduling follow-up, accessing educational content, or logging symptoms. For example, and without limitation, user interface 188 may include machine-readable formats, such as structured data transmitted to a clinical system or stored in an electronic health record for external processing or review. In some embodiments, computing device 120 may display follow-up action 160 using a user interface 188. In some embodiments, generating user interface 188 may include generating a notification associated with at least one impairment indicator 156 as a function of severity score. For the purposes of this disclosure, a "notification" is an indication to inform a user. In some embodiments, processor 124 may transmit notification to user device 140. In some embodiments, notification may include audio, text, image, vibration, and the like. In some embodiments, notification may include a text message, notification sound, phone call, notification banner, or the like. For example, and without limitation, user interface 188 may include a prompt or notification of "Schedule a follow-up appointment with your neurologist," "Begin low-intensity balance training exercises," "Use a walking aid during prolonged standing activities," or "Initiate home-based physical therapy module."

With continued reference to FIG. 1, for the purposes of this disclosure, a "user interface" is a means by which a user and a computer system interact; for example through the use of input devices and software. A user interface 188 may include a graphical user interface (GUI), command line interface (CLI), menu-driven user interface, touch user interface, voice user interface (VUI), form-based user interface, any combination thereof and the like. In some embodiments, user interface 188 may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 124. For example, a smart phone, smart, tablet, or laptop operated by a user or subject. In some embodiments, user interface 188 may be implemented in wearable device 104. In some embodiments, user interface 188 may be remote to wearable device 104. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

Figure 2B:
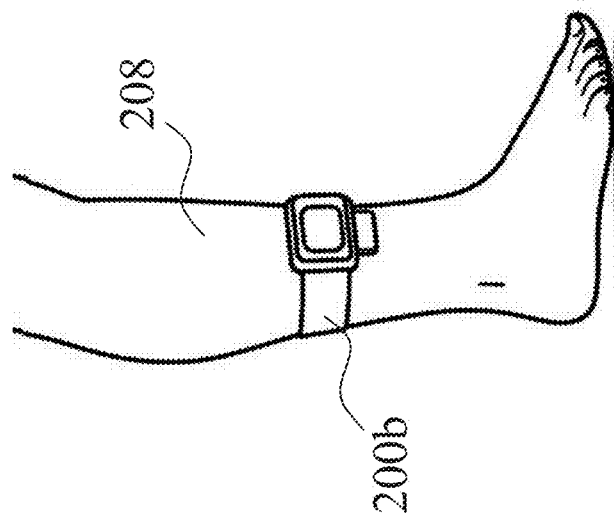
FIGS. 2A-2B illustrate wearable devices affixed to different body parts of a subject.
Figure 2A:
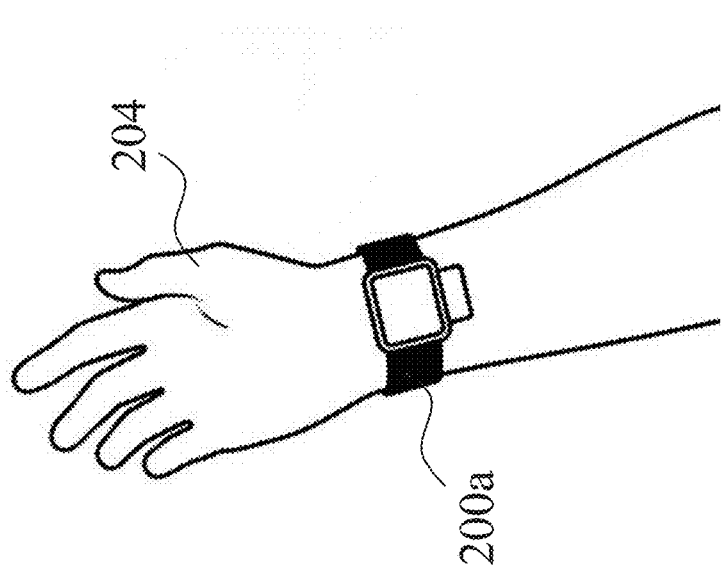

Referring now to FIGS. 2A-B, illustrations of wearable devices 200*a-b* affixed to different body parts of a subject are illustrated. In FIG. 2A, a wearable device 200*a* is shown affixed to the wrist of the subject's arm 204, while in FIG. 2B, a wearable device 200*b* is shown affixed to the ankle of the subject's leg 208. In some embodiments, wearable device 200*a-b* may be positioned to maintain stable contact with the skin surface and may be configured to acquire data during the subject's movement. In some embodiments, wearable devices 200*a-b* may include one or more embedded EMG sensors and motion sensors configured to detect electrical muscle activity and motion parameters, respectively, from the underlying muscle groups and joints. Data acquired from the sensors may be wirelessly transmitted to a computing device.

Figure 3:
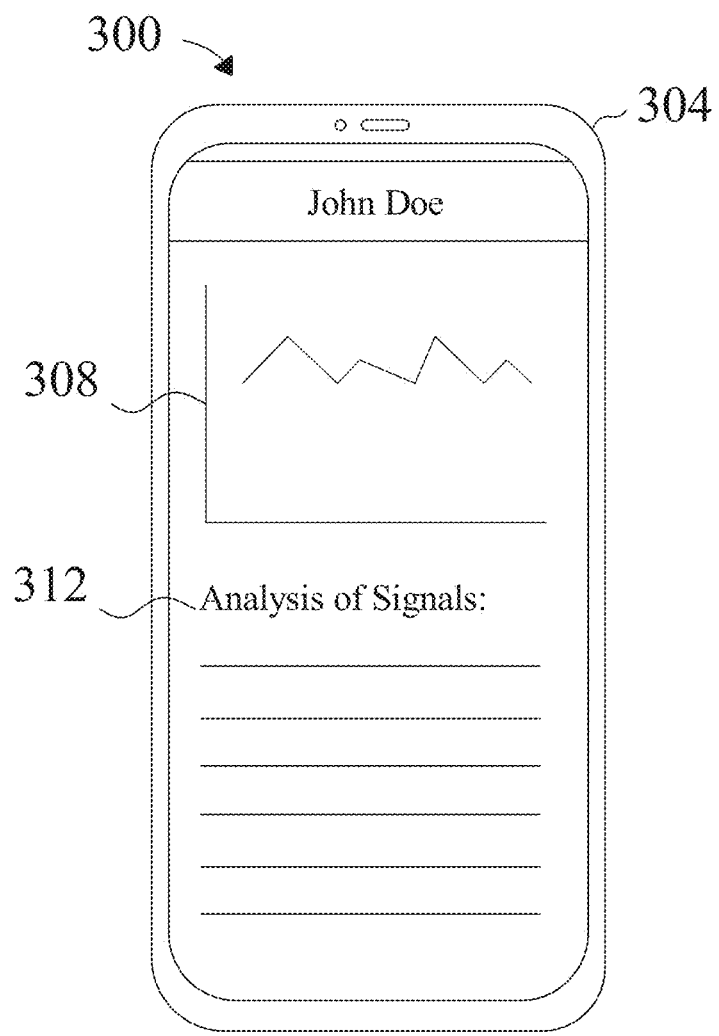
FIG. 3 illustrates an exemplary user interface.

Referring now to FIG. 3, an exemplary user interface 300 is illustrated. In some embodiments, user interface 300 may be displayed on a user device 304, wearable device, computing device, and the like. In some embodiments, user interface 300 may display a graphical representation of movement instability pattern 308, where the x-axis represents time and the y-axis represents signal magnitude (e.g., muscle activation amplitude, angular velocity or fused feature vector). In some embodiments, user interface 300 may display impairment indicator 312. As a non-limiting example, user interface 300 may include severity score, follow-up actions, and the like. In some embodiments, user interface 300 may include icons or color-coded elements indicating different stability levels or prompting the user to initiate a recommended follow-up action (e.g., consult a provider or perform a corrective exercise).

Figure 4A:
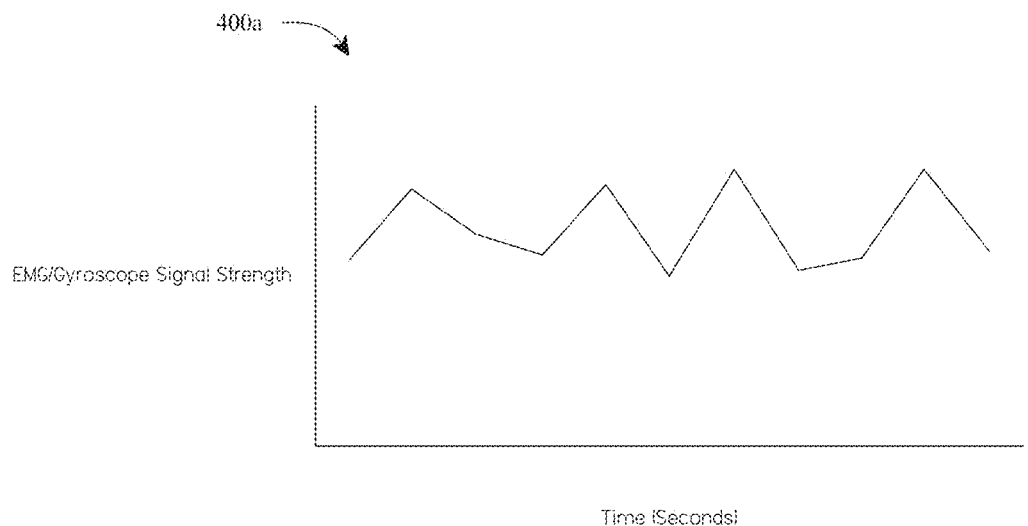
FIGS. 4A-4B illustrate signal graphs representing examples of unstable and stable movement patterns, respectively.
Figure 4B:
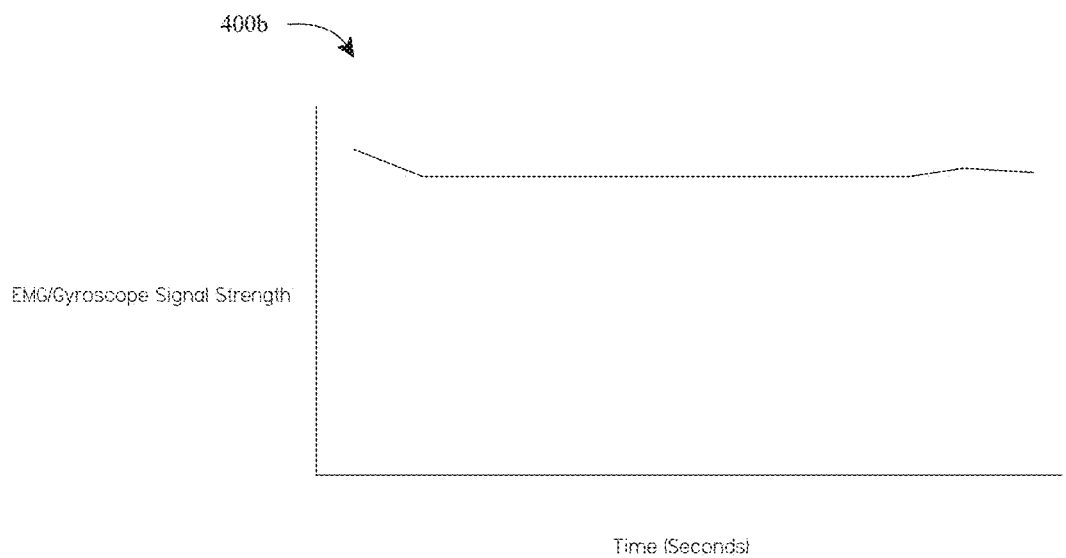

Referring now to FIGS. 4A-4B, signal graphs 400*a-b* representing examples of unstable and stable movement patterns, respectively. FIG. 4A illustrates a signal pattern representative of unstable movement. In some embodiments, the signal pattern illustrated in FIG. 4A may represent movement instability pattern. As shown, the signal contains irregular amplitude fluctuations, inconsistent periodicity, and abrupt transitions across time, indicative of disrupted neuromuscular control or abnormal motion. In a non-limiting example, these fluctuations may correspond to excessive tremor activity, poor coordination, or involuntary muscular responses. FIG. 4B illustrates a signal pattern representative of stable movement. The signal is characterized by smooth, periodic waveforms with consistent amplitude and regular timing, reflecting coordinated and controlled motion. In a non-limiting example, such a signal profile suggests a high level of neuromuscular stability, with minimal noise or aberrant behavior. Each graph plots signal amplitude over time, where the x-axis represents time in seconds and the y-axis represents signal magnitude, which may correspond to either electrical muscle activity (EMG data or EMG feature), a kinematic measurement such as angular velocity or acceleration (motion data or motion feature) derived from motion data or fused feature vector.

Figure 5:
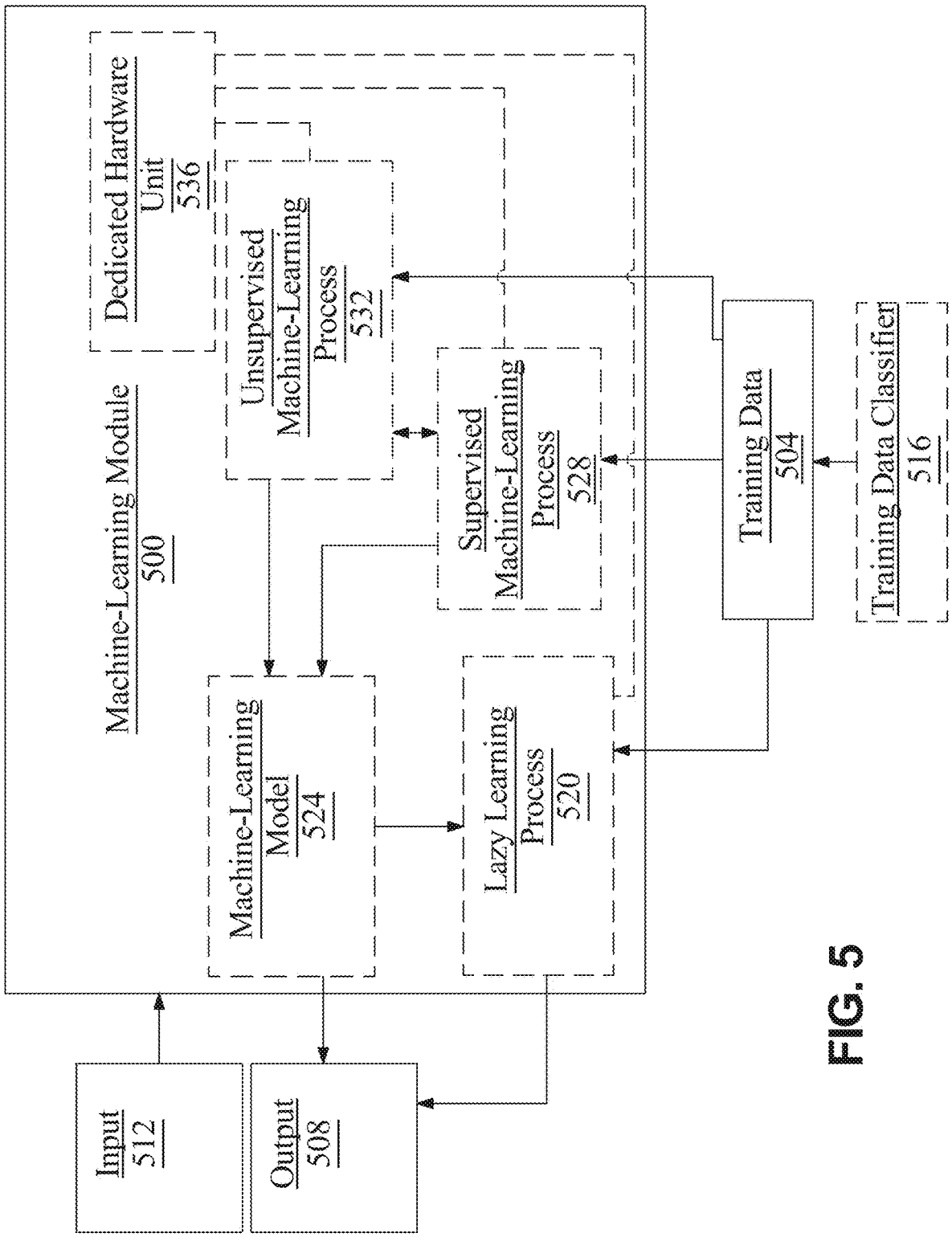
FIG. 5 illustrates an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, input data may include EMG data, motion data, fused feature vector, EMG feature, motion feature, movement instability pattern, subject data, subject cohort, and the like. As another non-limiting illustrative example, output data may include fused feature vector, EMG feature, motion feature, movement instability pattern, subject cohort, impairment indicator, and the like.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to subject cohort related to subject's age, gender, medical history, health condition, and the like.

Still referring to FIG. 5, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as input or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} \colon X_{new} = \frac{X - X_{min}}{X_{max} - X_{min}}.$$

Feature scaling may include mean normalization, which involves use of a mean value of a set and/or subset of values, $X_{mean}$ with maximum and minimum values $$X_{new} = \frac{X - X_{mean}}{X_{max} - X_{min}}.$$

Feature scaling may include standardization, where a minimum values: difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include EMG data, motion data, fused feature vector, EMG feature, motion feature, movement instability pattern, subject data, subject cohort, and the like as described above as inputs, fused feature vector, EMG feature, motion feature, movement instability pattern, subject cohort, impairment indicator, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any current or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
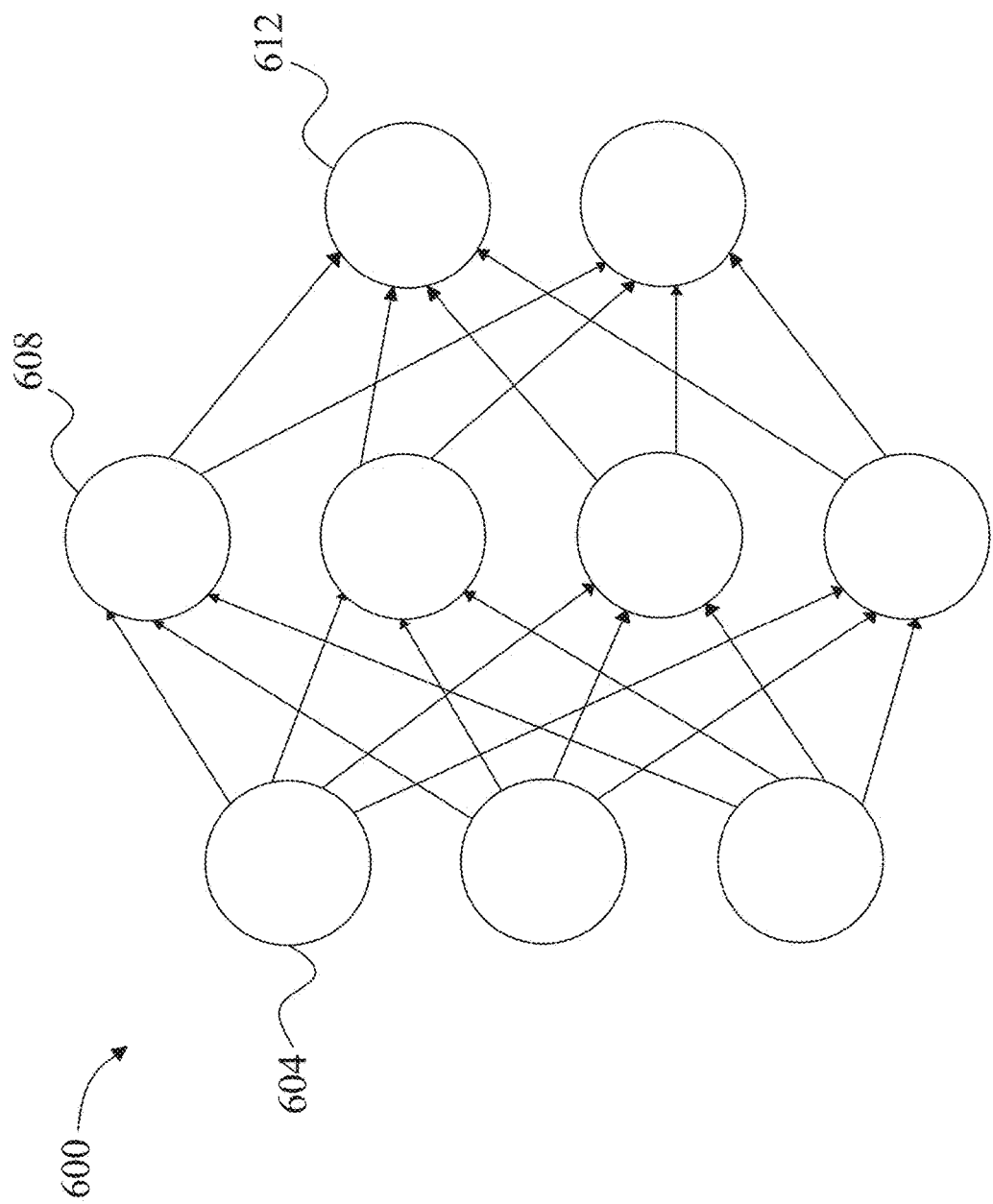
FIG. 6 illustrates an exemplary embodiment of neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
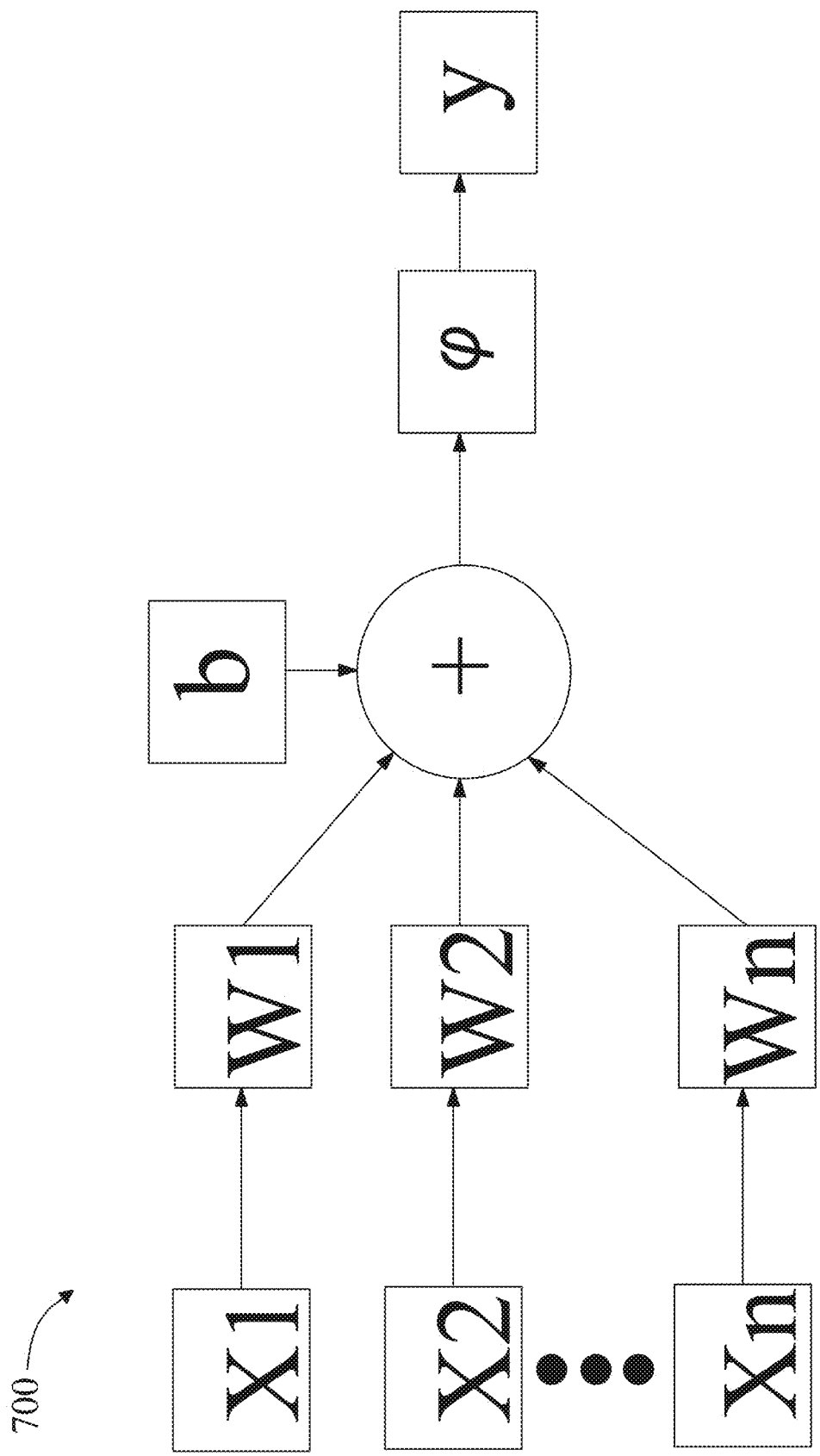
FIG. 7 illustrates an exemplary embodiment of a node of a neural network.

Referring now to FIG. 7, an exemplary embodiment of a node 700 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function linear units function such as may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a\ (1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $\omega_{new}$ is the updated weight value, $\omega_{old}$ is the previous weight value, α is a parameter to set the learning rate, and dj/dw is the partial derivative of with respect to weight w.

Figure 8:
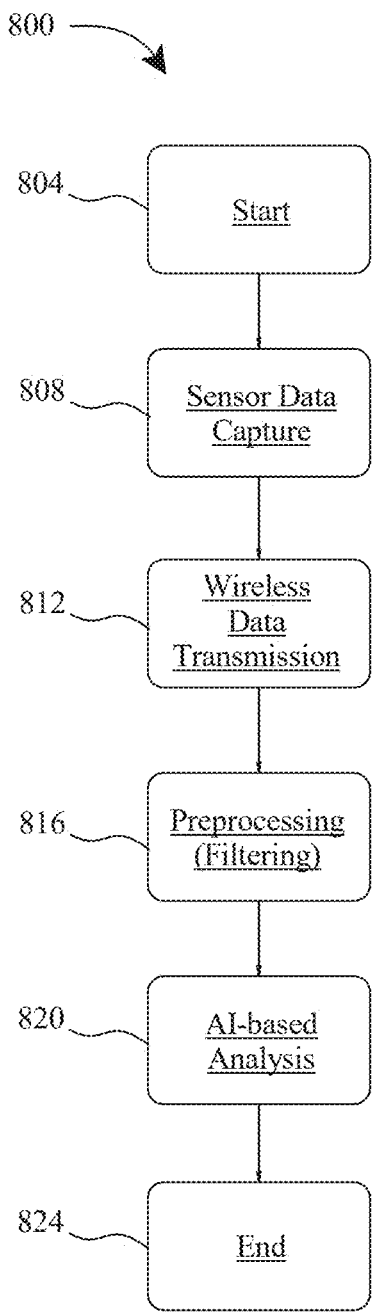
FIG. 8 illustrates a process flow diagram of an example embodiment of an operational sequence performed by a system for early detection of movement instability.

Referring now to FIG. 8, a process flow diagram 800 of an example embodiment of an operational sequence performed by a system for early detection of movement instability is illustrated. The process flow diagram 800 outlines a series of stages executed by a computing device and one or more wearable devices during operation. The process begins at the Start block 804, which initiates data acquisition and analysis sequence. This may occur automatically upon system activation, at scheduled intervals, or in response to a user command or activity trigger. In a non-limiting example, computing device may continuously or periodically monitor limb stability during normal daily activities. In the Sensor Data Capture block 808, EMG data and motion data may be collected by sensors embedded in a wearable device. These sensors may include surface electromyography electrodes, gyroscopes, and accelerometers configured to detect electrical muscle activity and body part movement in real time. In the Wireless Data Transmission block 812, the captured data may be transmitted from a wearable device to a computing device using a wireless communication protocol. As a non-limiting example, wireless communication protocol may include Bluetooth, Wi-Fi, or another low-power wireless standard. The Preprocessing (Filtering) block 816 may include signal conditioning applied to raw EMG and motion data. As a non-limiting example, preprocessing or filtering may include operations noise reduction, normalization, baseline drift correction, and signal segmentation. In the AI-based Analysis block 820, the preprocessed data may be input into one or more trained machine-learning models configured to detect movement instability patterns and determine at least one impairment indicator. In some embodiments, this analysis may include scoring severity of instability, classifying movement patterns, and generating recommendations for follow-up actions based on learned models trained on historical datasets. The process concludes at the End block 824, which signifies completion of the data processing cycle. At this point, a system may display results to a user or subject using a user interface, store the results for longitudinal tracking, or transmit them to an external system or healthcare provider for further review.

Figure 9:
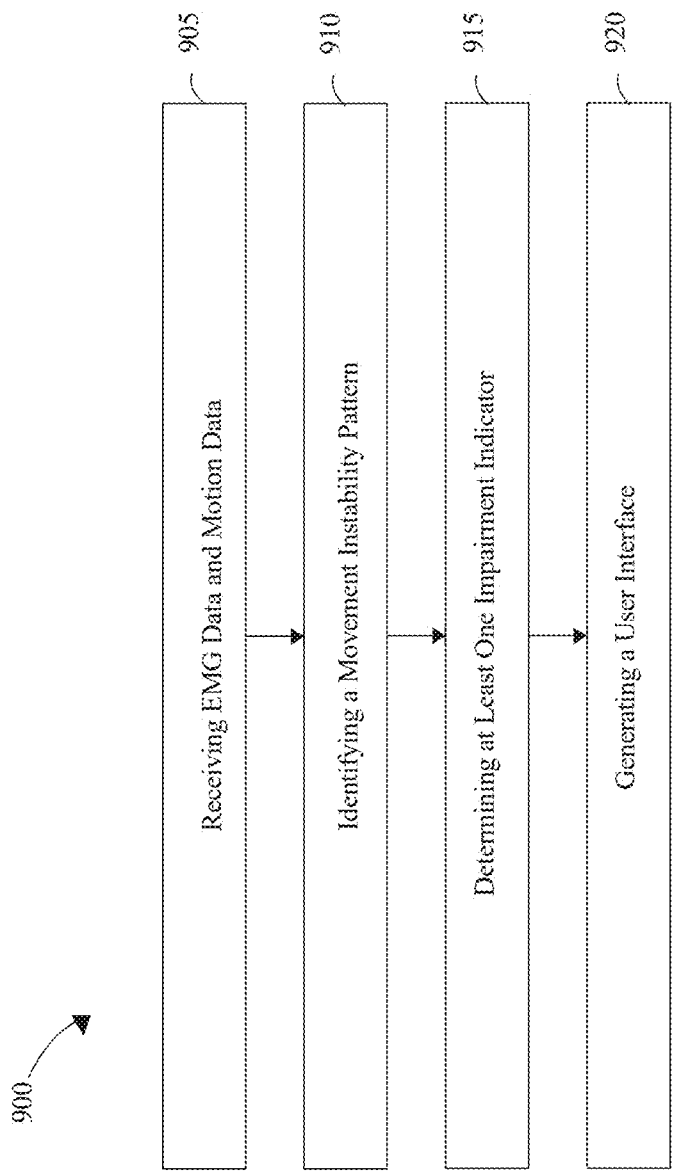
FIG. 9 illustrates a flow diagram of an exemplary method for early detection of movement instability.

Referring now to FIG. 9, a flow diagram of an exemplary method 900 for early detection of movement instability is illustrated. Method 900 contains a step 905 of receiving, using a computing device communicatively connected to a wearable device, electromyography (EMG) data from at least one EMG sensor of the wearable device and motion data from at least one motion sensor of the wearable device, wherein the wearable device is configured to be affixed to at least one body part of a subject, the at least one EMG sensor to detect electrical muscle activity of the subject and at least one motion sensor to detect movement of the at least one body part. In some embodiments, the at least one motion sensor may include a gyroscope. In some embodiments, receiving the EMG data and the motion data may include receiving encrypted EMG data and encrypted motion data and decrypting the encrypted EMG data and the encrypted motion data using a cryptographic key stored in the memory. These may be implemented as reference to FIGS. 1-8.

With continued reference to FIG. 9, method 900 contains a step 910 of identifying, using a computing device, a movement instability pattern as a function of EMG data and motion data using a pattern machine-learning model that has been trained on pattern training datasets including known stable and unstable muscle activity data and movement patterns. In some embodiments, identifying the movement instability pattern may include synchronizing the EMG data and the motion data as a function of time references of each of the EMG data and the motion data. In some embodiments, identifying the movement instability pattern may include: segmenting the EMG data and the motion data into a plurality of time windows, extracting, for each time window of the plurality of time windows, one or more EMG features from the EMG data indicative of muscle activation and one or more motion features from the motion data indicative of rotational movement, and identifying the movement instability pattern as a function of the one or more EMG features and the one or more motion features. In some embodiments, identifying the movement instability pattern may include concatenating the one or more EMG features and the one or more motion features into a fused feature vector. These may be implemented as reference to FIGS. 1-8.

With continued reference to FIG. 9, method 900 contains a step 915 of determining, using a computing device, at least one impairment indicator as a function of a movement instability pattern. In some embodiments, determining the at least an impairment indicator may include generating one or more follow-up actions as a function of the at least an impairment indicator and at least one prior follow-up action associated with the subject. In some embodiments, determining the at least one impairment indicator may include receiving subject data from a user device, classifying the subject data to subject cohorts as a function of subject demographics of the subject data, and determining the at least one impairment indicator as a function of the subject cohorts. In some embodiments, determining the at least one impairment indicator may include identifying a severity score of the movement instability pattern as a function of the one or more EMG features and the one or more motion features. These may be implemented as reference to FIGS. 1-8.

With continued reference to FIG. 9, method 900 contains a step 920 of generating, using a computing device, a user interface including a display of at least one impairment indicator. In some embodiments, generating the user interface may include generating a notification associated with the at least one impairment indicator as a function of the severity score. These may be implemented as reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
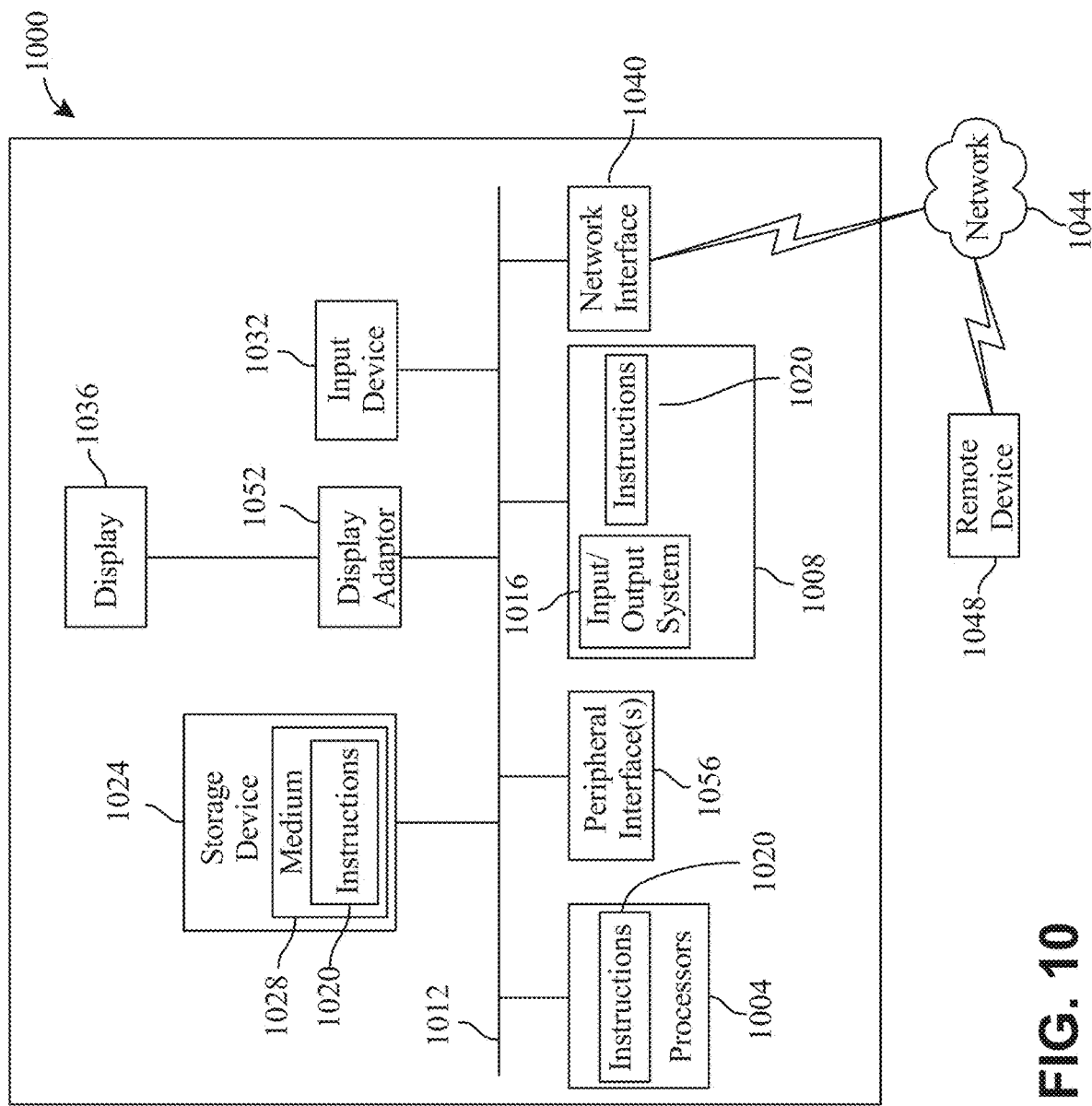
FIG. 10 illustrates a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicates with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof. Memory 1008 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In some embodiments, storage device 1024 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display 1036. Examples of a display device include, but are not limited to, a liquid crystal display (LCD), a cathode ray tube (CRT), a plasma display, a light emitting diode (LED) display, and any combinations thereof. Display adapter 1052 and display 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

Further referring to FIG. 10, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 10, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 10, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 1000, processor 1004, and memory 1008 may be virtualized; that is, a virtual machine and/or container may interact directly with such computing system 1000, processor 1004, and/or memory 1008, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 1004 comprises a plurality of processors and/or processor cores, virtualization may, in some cases, simulate or emulate a single (virtual) processor whose functions are allocated to one or more of the plurality of processors and/or processor cores. In this case, while processor 1004 may be said to be virtualized, the processor 1004, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for early detection of movement instability, the system comprising:

a wearable device configured to be affixed to at least one body part of a subject, wherein the wearable device comprises:
  at least one electromyography (EMG) sensor to detect electrical muscle activity of the subject; and
  at least one motion sensor to detect movement of the at least one body part; and
a computing device communicatively connected to the wearable device, wherein the computing device is configured to:
  receive subject data;
  receive EMG data from the at least one EMG sensor and motion data from the at least one motion sensor;
  identify a movement instability pattern as a function of the EMG data and the motion data using a plurality of pattern machine-learning models that have been trained on pattern training datasets comprising known stable and unstable muscle activity data and movement patterns, wherein identifying the movement instability pattern comprises:
    classifying the subject data into one or more subject cohorts;
    selecting one pattern machine-learning model from the plurality of pattern machine-learning models as a function of the one or more subject cohorts; and
    identifying the movement instability pattern using the selected pattern machine-learning model;
  determine at least one impairment indicator as a function of the movement instability pattern; and
  generate a user interface comprising a display of the at least one impairment indicator.

2. The system of claim 1, wherein the at least one motion sensor comprises a gyroscope.

3. The system of claim 1, wherein:
  the wearable device is configured to encrypt the EMG data from the at least one EMG sensor and the motion data from the at least one motion sensor in real-time using a cryptographic algorithm; and
  receiving the EMG data and the motion data comprises:
    receiving the encrypted EMG data and the encrypted motion data from the wearable device; and
    decrypting the encrypted EMG data and the encrypted motion data using a cryptographic key stored in the memory.

4. The system of claim 1, wherein identifying the movement instability pattern comprises synchronizing the EMG data and the motion data as a function of time references of each of the EMG data and the motion data.

5. The system of claim 1, wherein identifying the movement instability pattern comprises:
  segmenting the EMG data and the motion data into a plurality of time windows;
  extracting, for each time window of the plurality of time windows, one or more EMG features from the EMG data indicative of muscle activation and one or more motion features from the motion data indicative of rotational movement; and
  identifying the movement instability pattern as a function of the one or more EMG features and the one or more motion features.

6. The system of claim 5, wherein identifying the movement instability pattern comprises concatenating the one or more EMG features and the one or more motion features into a fused feature vector.

7. The system of claim 5, wherein determining the at least one impairment indicator comprises identifying a severity score of the movement instability pattern as a function of the one or more EMG features and the one or more motion features.

8. The system of claim 7, wherein generating the user interface comprises generating a notification associated with the at least one impairment indicator as a function of the severity score.

9. The system of claim 1, wherein determining the at least one impairment indicator comprises generating one or more follow-up actions as a function of the at least one impairment indicator and at least one prior follow-up action associated with the subject, wherein the one or more follow-up actions comprises a clinical intervention.

10. The system of claim 1, wherein determining the at least one impairment indicator comprises:
  receiving subject data comprises receiving the subject data from a user device;
  classifying the subject data into the one or more subject cohorts comprises classifying the subject data as a function of subject demographics of the subject data; and
  determining the at least one impairment indicator as a function of the one or more subject cohorts.

11. A method for early detection of movement instability, the method comprising:
  receiving, using a computing device communicatively connected to a wearable device, subject data;
  receiving, using the computing device, electromyography (EMG) data from at least one EMG sensor of the wearable device and motion data from at least one motion sensor of the wearable device, wherein:
    the wearable device is configured to be affixed to at least one body part of a subject;
    the at least one EMG sensor to detect electrical muscle activity of the subject; and
    at least one motion sensor to detect movement of the at least one body part;
  identifying, using the computing device, a movement instability pattern as a function of the EMG data and the motion data using a plurality of pattern machine-learning models that have been trained on pattern training datasets comprising known stable and unstable muscle activity data and movement patterns, wherein identifying the movement instability pattern comprises:
    classifying the subject data into one or more subject cohorts;
    selecting one pattern machine-learning model from the plurality of pattern machine-learning models as a function of the one or more subject cohorts; and
    identifying the movement instability pattern using the selected pattern machine-learning model;
  determining, using the computing device, at least one impairment indicator as a function of the movement instability pattern; and
  generating, using the computing device, a user interface comprising a display of the at least one impairment indicator.

12. The method of claim 11, wherein the at least one motion sensor comprises a gyroscope.

13. The method of claim 11, further comprising:
  encrypting, using the wearable device, the EMG data from the at least one EMG sensor and the motion data from the at least one motion sensor in real-time using a cryptographic algorithm; and
  receiving the EMG data and the motion data comprises:
    receiving the encrypted EMG data and the encrypted motion data from the wearable device; and decrypting the encrypted EMG data and the encrypted motion data using a cryptographic key stored in the memory.

14. The method of claim 11, wherein identifying the movement instability pattern comprises synchronizing the EMG data and the motion data as a function of time references of each of the EMG data and the motion data.

15. The method of claim 11, wherein identifying the movement instability pattern comprises:
segmenting the EMG data and the motion data into a plurality of time windows;
extracting, for each time window of the plurality of time windows, one or more EMG features from the EMG data indicative of muscle activation and one or more motion features from the motion data indicative of rotational movement; and
identifying the movement instability pattern as a function of the one or more EMG features and the one or more motion features.

16. The method of claim 15, wherein identifying the movement instability pattern comprises concatenating the one or more EMG features and the one or more motion features into a fused feature vector.

17. The method of claim 15, wherein determining the at least one impairment indicator comprises identifying a severity score of the movement instability pattern as a function of the one or more EMG features and the one or more motion features.

18. The method of claim 17, wherein generating the user interface comprises generating a notification associated with the at least one impairment indicator as a function of the severity score.

19. The method of claim 11, wherein determining the at least one impairment indicator comprises generating one or more follow-up actions as a function of the at least one impairment indicator and at least one prior follow-up action associated with the subject, wherein the one or more follow-up actions comprises a clinical intervention.

20. The system of claim 11, wherein determining the at least one impairment indicator comprises:
receiving subject data comprises receiving the subject data from a user device;
classifying the subject data into the one or more subject cohorts comprises classifying the subject data as a function of subject demographics of the subject data; and
determining the at least one impairment indicator as a function of the one or more subject cohorts.

* * * * *